(12) United States Patent
Asai

(10) Patent No.: US 10,508,923 B2
(45) Date of Patent: Dec. 17, 2019

(54) VEHICLE POSITION ESTIMATION DEVICE, VEHICLE POSITION ESTIMATION METHOD

(71) Applicant: Nissan Motor Co., Ltd., Yokohama-shi, Kanagawa (JP)

(72) Inventor: Toshihiro Asai, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 27 days.

(21) Appl. No.: 15/755,900

(22) PCT Filed: Aug. 28, 2015

(86) PCT No.: PCT/JP2015/004383
§ 371 (c)(1),
(2) Date: Feb. 27, 2018

(87) PCT Pub. No.: WO2017/037753
PCT Pub. Date: Mar. 9, 2017

(65) Prior Publication Data
US 2019/0033082 A1    Jan. 31, 2019

(51) Int. Cl.
*G01C 21/30* (2006.01)
*G05D 1/02* (2006.01)
*G01C 21/36* (2006.01)

(52) U.S. Cl.
CPC ......... *G01C 21/30* (2013.01); *G01C 21/3602* (2013.01); *G05D 1/0246* (2013.01); *G05D 1/0274* (2013.01)

(58) Field of Classification Search
CPC ....... G01S 17/89; G01S 17/023; G01C 21/30; G01C 21/3602; G05D 1/0246;
(Continued)

(56) References Cited

U.S. PATENT DOCUMENTS

| 5,220,508 A | * | 6/1993 | Ninomiya | G01S 3/7864 180/168 |
| 5,483,455 A | * | 1/1996 | Lay | G01S 13/345 701/469 |

(Continued)

FOREIGN PATENT DOCUMENTS

| CN | 107924192 A | 4/2018 |
| EP | 3306429 A1 | 4/2018 |

(Continued)

OTHER PUBLICATIONS

JPO machine translation of JP 2001-331787 (original JP document published Nov. 30, 2001) (Year: 2001).*

(Continued)

*Primary Examiner* — Behrang Badii
*Assistant Examiner* — David A Testardi
(74) *Attorney, Agent, or Firm* — Young Basile Hanlon & MacFarlane, P.C.

(57) ABSTRACT

In this vehicle position estimation device, positions of a target present in a periphery of a vehicle is detected and, in conjunction therewith, amounts of movements of the vehicle is detected, and the positions of the target is stored as target position data, based on the amounts of movements. In addition, a portion of the target position data are grouped into a group according to turning states of the vehicle, and, based on amounts of movements of the vehicle when the target position data are detected, an adjustment range for the group is set. Further, map information including positions of the target is acquired and, by matching the target position data with the positions of the target in the map information based on the set adjustment range, a vehicle position of the vehicle is estimated.

17 Claims, 16 Drawing Sheets

(58) Field of Classification Search
CPC .. G05D 1/0272; G05D 1/0274; G05D 1/0253; G08G 1/13; G08G 1/137
See application file for complete search history.

(56) References Cited

U.S. PATENT DOCUMENTS

| | | | |
|---|---|---|---|
| 8,369,606 B2* | 2/2013 | Liu | G06K 9/00476 382/106 |
| 9,043,072 B1* | 5/2015 | Tisdale | G05D 1/021 701/28 |
| 9,081,383 B1* | 7/2015 | Montemerlo | G08G 1/164 |
| 9,395,192 B1* | 7/2016 | Silver | G06K 9/00798 |
| 10,145,693 B2* | 12/2018 | Asai | G01C 21/30 |
| 10,267,640 B2* | 4/2019 | Asai | G01C 21/14 |
| 10,289,120 B2* | 5/2019 | Ueda | G01C 21/165 |
| 2002/0065603 A1* | 5/2002 | Watanabe | G01C 21/30 701/446 |
| 2006/0287812 A1* | 12/2006 | Takashima | G01C 7/04 701/446 |
| 2007/0078594 A1* | 4/2007 | Mori | G01C 21/00 701/408 |
| 2008/0091327 A1* | 4/2008 | Tsuchiya | B60K 31/0066 701/93 |
| 2008/0262721 A1* | 10/2008 | Guo | G01C 21/32 701/532 |
| 2009/0055092 A1* | 2/2009 | Yokota | G01C 21/30 701/532 |
| 2010/0001991 A1* | 1/2010 | Jeong | G05D 1/0246 345/418 |
| 2010/0191461 A1* | 7/2010 | Zeng | B60W 40/072 701/532 |
| 2010/0241355 A1* | 9/2010 | Park | G01C 21/30 701/533 |
| 2010/0274387 A1* | 10/2010 | Pitzer | G06N 7/005 700/246 |
| 2011/0054791 A1* | 3/2011 | Surampudi | G01C 21/005 701/472 |
| 2012/0106829 A1* | 5/2012 | Lee | G05D 1/0274 382/153 |
| 2012/0185167 A1* | 7/2012 | Higuchi | G01C 21/3602 701/461 |
| 2012/0239239 A1* | 9/2012 | Suyama | G05D 1/024 701/25 |
| 2012/0310516 A1* | 12/2012 | Zeng | G01C 21/32 701/300 |
| 2014/0297093 A1* | 10/2014 | Murai | G01C 21/20 701/27 |
| 2015/0260530 A1* | 9/2015 | Stenborg | G01C 21/30 701/461 |
| 2017/0015317 A1* | 1/2017 | Fasola | B60W 30/12 |
| 2017/0038477 A1* | 2/2017 | Schmid | G01S 19/48 |
| 2018/0304891 A1* | 10/2018 | Heidenreich | G01C 21/3602 |

FOREIGN PATENT DOCUMENTS

| | | | | |
|---|---|---|---|---|
| EP | 3327532 A1 | 5/2018 | | |
| JP | H06-282798 A | 10/1994 | | |
| JP | H09-033642 A | 2/1997 | | |
| JP | H11-304513 A | 11/1999 | | |
| JP | 2001331787 A | * | 11/2001 | |
| JP | 2003255047 A | * | 9/2003 | |
| JP | 2004271513 A | * | 9/2004 | G01S 17/936 |
| JP | 2008065087 A | * | 3/2008 | G06K 9/00704 |
| JP | 2008250906 A | | 10/2008 | |
| JP | 2012208525 A | * | 10/2012 | G06K 9/00704 |
| JP | 2013148355 A | * | 8/2013 | |
| JP | 2013148356 A | * | 8/2013 | G01S 17/936 |
| JP | 2014093018 A | * | 5/2014 | |

OTHER PUBLICATIONS

Levinson, Jesse et al., "Map-based precision vehicle localization in urban environments", Robotics: Science and Systems 2007, Atlanta, GA, USA, Jun. 27-30, 2007, 8 pages. (Year: 2007).*

Harrison, Alastair et al., "High Quality 3D Laser Ranging Under General Vehicle Motion", 2008 IEEE International Conference on Robotics and Automation, Pasadena, CA, USA, May 19-23, 2008, pp. 7-12. (Year: 2008).*

Moosmann, Frank et al., "Velodyne SLAM", 2011 IEEE Intelligent Vehicles Symposium (IV), Baden-Baden, Germany, Jun. 5-9, 2011, pp. 393-398. (Year: 2011).*

Alonso, Ignacio Parra et al., Accurate Global Localization Using Visual Odometry and Digital Maps on Urban Environments, IEEE Transactions on Intelligent Transportation Systems, vol. 14 No. 3, Dec. 2012, pp. 1535-1545. (Year: 2012).*

* cited by examiner

[t1]

[t2]

[t3]

[t4]

VEHICLE POSITION ESTIMATION DEVICE, VEHICLE POSITION ESTIMATION METHOD

TECHNICAL FIELD

The present invention relates to a vehicle position estimation device and a vehicle position estimation method.

BACKGROUND

A conventional technology disclosed in JP 2008-250906 A is a technology in which a mobile robot moving autonomously estimates a vehicle position according to amount of movement and, by matching a passage detected by laser scan with map information acquired in advance, performs correction of the estimated vehicle position. The detected passage and the map information are treated as two-dimensional data when viewed in plan, and, when performing matching between them, only data in a predetermined range from a present location are used.

When error occurs in information of a detected passage because of an occurrence of error in the amount of movement, a difference occurs between a detected shape of the passage and the actual shape of the passage and the degree of matching between information of the detected passage and map information decreases, which prevents a vehicle position from being estimated with high accuracy.

SUMMARY

An object of the present invention is to improve estimation accuracy of vehicle positions.

A vehicle position estimation device according to one aspect of the present invention detects positions of a target present in a periphery of a vehicle and, in conjunction therewith, detects amounts of movements of the vehicle, and stores the positions of the target as target position data, based on the amounts of movements. In addition, the vehicle position estimation device groups a portion of the target position data into a group according to turning states of the vehicle, and, based on amounts of movements of the vehicle when the target position data are detected, sets an adjustment range for the group. Further, the vehicle position estimation device acquires map information including positions of the target and, by matching the target position data with the positions of the target in the map information based on the set adjustment range, estimates a vehicle position of the vehicle.

According to the present invention, since, by matching target position data with map information while adjusting the target position data within an adjustment range, a vehicle position of the vehicle is estimated, estimation accuracy of vehicle positions may be improved.

DETAILED DESCRIPTION OF THE EMBODIMENTS

An embodiment of the present invention will now be described with reference to the drawings. Note that the drawings are schematic and are sometimes different from actual embodiments. In addition, the following embodiment indicates devices and methods to embody the technical idea of the present invention by way of example and does not limit the configuration to that described below. In other words, the technical idea of the present invention can be subjected to a variety of alterations within the technical scope prescribed by CLAIMS.

First Embodiment

<Configuration>

Figure 1:
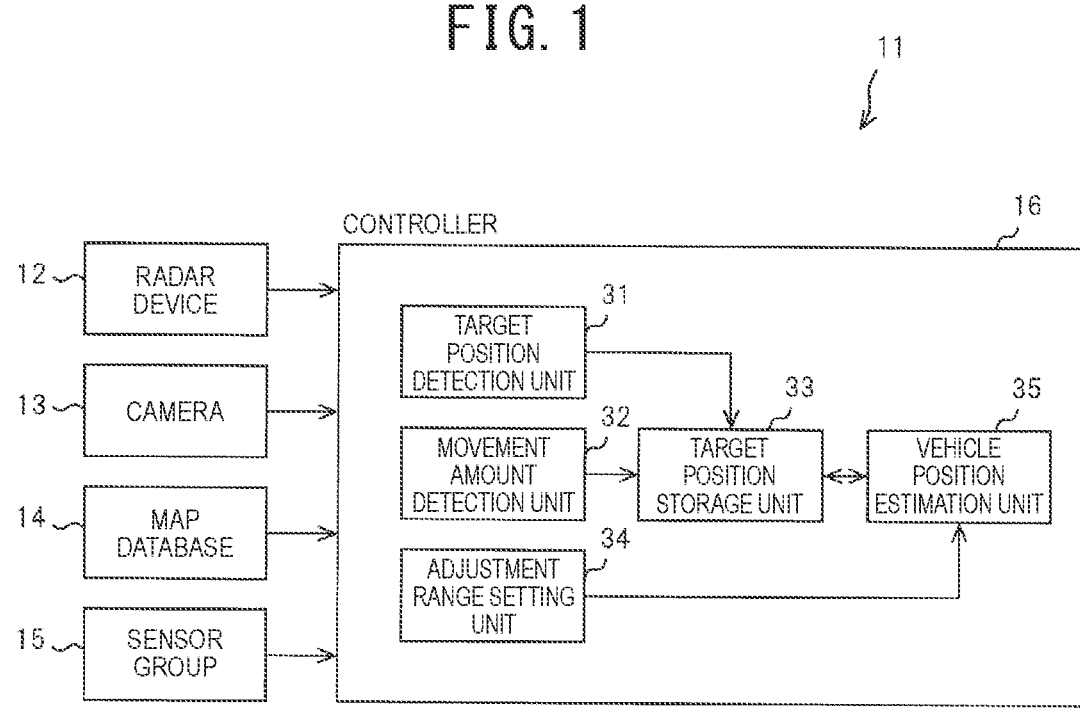
FIG. 1 is a configuration diagram of a vehicle position estimation device.

FIG. 1 is a configuration diagram of a vehicle position estimation device.

A vehicle position estimation device 11 is a device configured to estimate a vehicle position of a vehicle and includes radar devices 12, cameras 13, a map database 14, a sensor group 15, and a controller 16.

Figure 2:
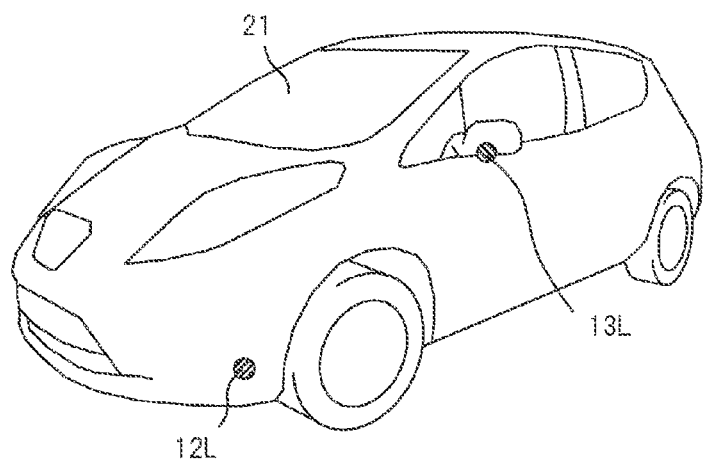
FIG. 2 is a diagram illustrative of an arrangement of radar devices and cameras.
Figure 2:
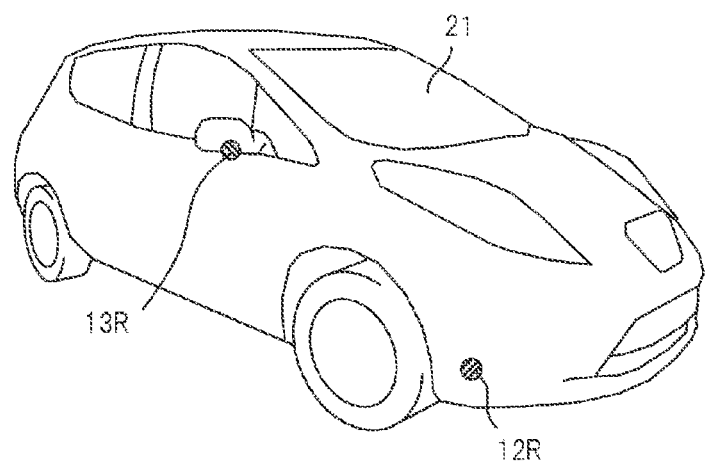

FIG. 2 is a diagram illustrative of an arrangement of the radar devices and the cameras.

Figure 3:
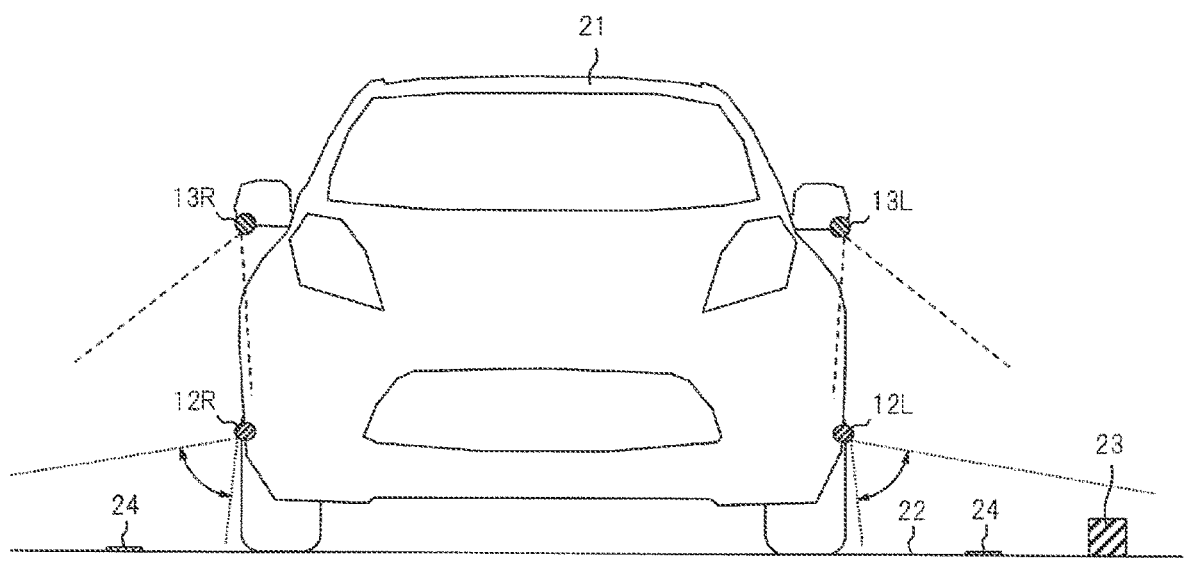
FIG. 3 is a diagram illustrative of scan ranges of the radar devices and imaging ranges of the cameras.

FIG. 3 is a diagram illustrative of scan ranges of the radar devices and imaging ranges of the cameras.

Each radar device 12 has a configuration including, for example, a laser range finder (LRF), measures a distance and a direction to an object that is present laterally to a vehicle 21, and outputs the measured data to the controller 16. The radar devices 12 are disposed at two places in total on the left side surface and the right side surface of the vehicle 21. When the two radar devices 12 are discriminated from each other, the radar devices disposed on the left side surface and the right side surface of the vehicle 21 are referred to as a left side radar device 12L and a right side radar device 12R, respectively. The left side radar device 12L and the right side radar device 12R scan in directions from downward to leftward and in directions from downward to rightward, respectively. In other words, each of the left side radar device 12L and the right side radar device 12R has a rotation axis in the longitudinal direction of the vehicle body and scans in right angle directions to the axis. This operation detects distances and directions to a road surface 22 and a curb 23 present laterally to the vehicle body. The curb 23 is provided at a shoulder of a road along a driving lane as a boundary line between a roadway and a sidewalk.

Each camera 13 has a configuration including, for example, a wide angle camera using a charge coupled device (CCD) image sensor, images a lateral side of the vehicle 21, and outputs imaged data to the controller 16. The cameras 13 are disposed at two places in total on a left door mirror and a right door mirror of the vehicle 21. When the two cameras 13 are discriminated from each other, the cameras disposed on the left door mirror and the right door mirror of the vehicle 21 are referred to as a left side camera 13L and a right side camera 13R, respectively. The left side camera 13L and the right side camera 13R image the road surface 22 on the left side and the right side of the vehicle 21, respectively. This operation detects lane markings 24 present laterally to the vehicle body. The lane markings 24 are compartment lines, such as white lines, that are painted on the road surface 22 to mark a driving lane (vehicular lane) that the vehicle 21 is required to travel, and are marked along the driving lane. Note that, although the lane markings 24 are illustrated in three-dimensions for descriptive purposes in FIG. 3, it is assumed that the lane markings 24 are flush with the road surface 22 because the thickness thereof can be regarded as zero in practice.

The map database 14 acquires road map information. In the road map information, position information of the curb 23 and the lane markings 24 is included. Although being an object that has a height, the curb 23 is acquired as two-dimensional data when viewed in plan. The curb 23 and the lane markings 24 are coded into data that are a collection of straight lines, in which each straight line is acquired as position information of both endpoints thereof and a circular arc curve that curves is treated as straight lines that compose a broken line approximating the circular arc curve. Note that the map database 14 may be a storage medium that stores road map information for a vehicle navigation system or may acquire the map information from the outside via a communication system, such as a wireless communication system (road-vehicle communication and inter-vehicle communication are also applicable). In this case, the map database 14 may obtain latest map information periodically and update retained map information. The map database 14 may also accumulate courses that the vehicle has actually traveled as the map information.

The sensor group 15 includes, for example, a GPS receiver, an accelerator sensor, a steering angle sensor, a brake sensor, a vehicle speed sensor, acceleration sensors, wheel speed sensors, a yaw rate sensor, and the like and outputs respective detected data to the controller 16. The GPS receiver acquires present location information of the vehicle 21. The accelerator sensor detects an operation amount of an accelerator pedal. The steering angle sensor detects an operation amount of a steering wheel. The brake sensor detects an operation amount of a brake pedal and pressure inside a brake booster. The vehicle speed sensor detects a vehicle speed. The acceleration sensors detect an acceleration/deceleration in the longitudinal direction and a lateral acceleration of the vehicle. The wheel speed sensors detect wheel speeds of respective wheels. The yaw rate sensor detects a yaw rate of the vehicle.

The controller 16 has a configuration including, for example, an electronic control unit (ECU), which includes a CPU, a ROM, a RAM, and the like, and, in the ROM, a program that executes various types of operation processing, such as vehicle position estimation processing, which will be described later, is recorded. Note that a controller 16 dedicated for the vehicle position estimation processing may be provided or another controller may be configured to also serve as a controller for the vehicle position estimation processing.

The controller 16 includes, as constituent functional blocks, a target position detection unit 31, a movement amount detection unit 32, a target position storage unit 33, an adjustment range setting unit 34, and a vehicle position estimation unit 35.

The target position detection unit 31 detects positions of targets present in a periphery of a vehicle, such as a curb 23 and lane markings 24, as relative positions with respect to the vehicle in a vehicle coordinate system fixed to the vehicle.

Figure 4:
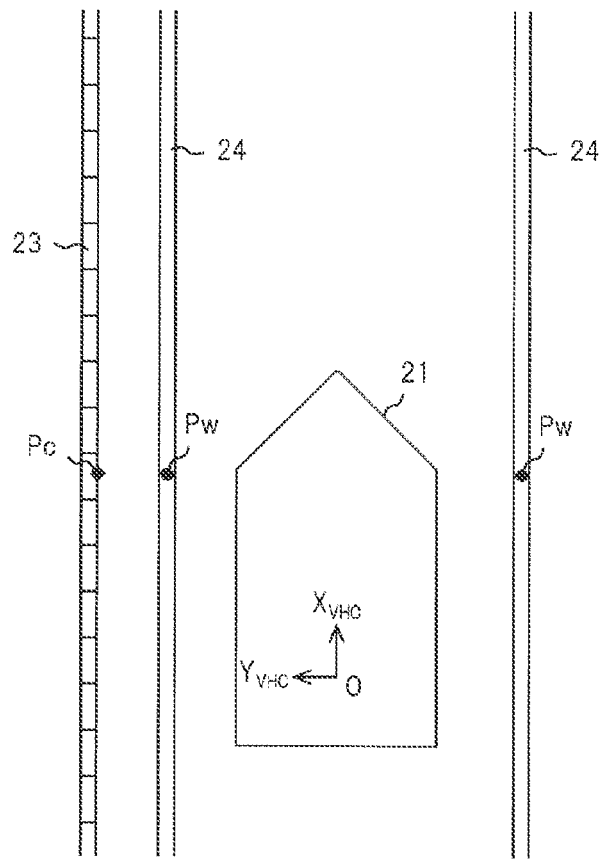
FIG. 4 is a diagram illustrative of a vehicle coordinate system.

FIG. 4 is a diagram illustrative of the vehicle coordinate system.

The vehicle coordinate system is two-dimensional coordinates when viewed in plan, and, for example, the middle of the rear wheel axle, the longitudinal direction, and the right and left directions of the vehicle 21 are assumed to be the origin O, the $X_{VHC}$-axis, and the $Y_{VHC}$-axis, respectively. A formula that converts each of the coordinate systems of the radar devices 12 and the coordinate systems of the cameras 13 to the vehicle coordinate system is obtained in advance. In addition, parameters of the road surface 22 in the vehicle coordinate system are known in advance.

The road surface 22 is laser scanned toward the outer sides in the vehicle width direction by use of the radar devices 12 and a position at which a large change in height (a level difference) is observed by the scan is detected as an endpoint on the roadway side in the width direction of the curb 23. In other words, a position of the curb 23 is detected from three-dimensional data and is projected onto the two-dimensional vehicle coordinate system. In FIG. 4, a detection point of the curb 23 is denoted by Pc and is indicated by a filled rhombus.

By imaging the road surface 22 by use of the cameras 13 and, in imaged gray scale images, extracting patterns in which brightness changes from a dark section to a bright section and from a bright section to a dark section along the right and left directions of the vehicle body, the lane markings 24 are detected. For example, middle points in the width direction of the lane markings 24 are detected. In other words, image data imaged by the cameras 13 are converted by means of bird's eye view conversion into bird's eye view images, from which the lane markings 24 are detected and projected onto the vehicle coordinate system. In FIG. 4, detection points of the lane markings 24 are denoted by Pw and are indicated by filled circles.

The movement amount detection unit 32 detects an odometry that is an amount of movement per unit time of the vehicle 21 from various types of information detected by the sensor group 15. Integration of odometries enables a travel trajectory of the vehicle to be calculated in an odometry coordinate system.

Figure 5:
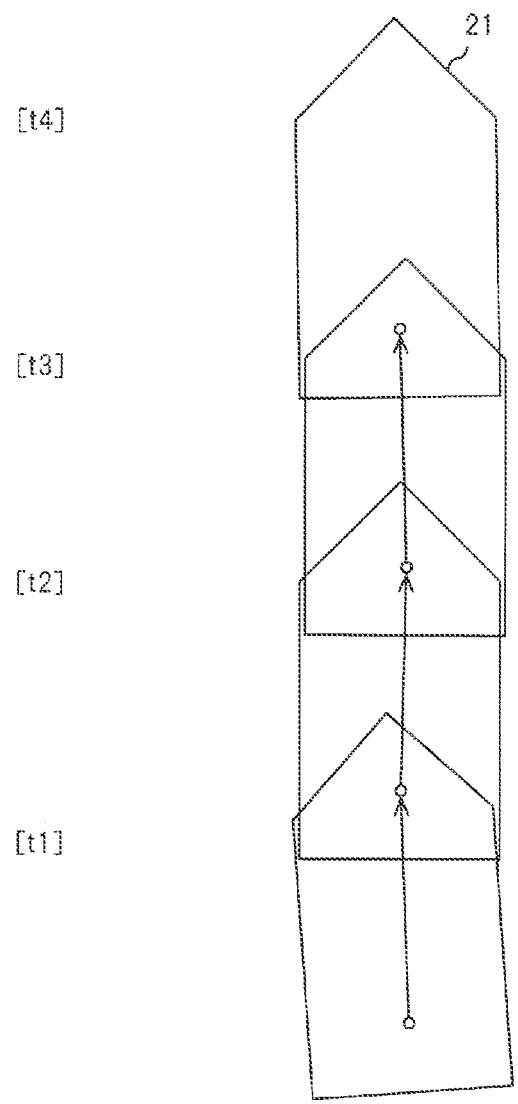
FIG. 5 is a diagram illustrative of an odometry coordinate system.

FIG. 5 is a diagram illustrative of the odometry coordinate system.

The odometry coordinate system assumes a position of the vehicle at a point of time when, for example, power for the system is turned on or cut off to be the origin of coordinates and a vehicle body attitude (azimuth) at the point of time to be 0 degrees. By storing three parameters, namely a coordinate position $[X_{ODM}, Y_{ODM}]$ and a vehicle body attitude $[\theta_{ODM}]$, of the vehicle in the odometry coordinate system at each operation cycle, a travel trajectory is detected. In FIG. 5, coordinate positions and vehicle body attitudes of the vehicle at times t1 to t4 are illustrated. Note that, with a present location of the vehicle set to the origin, coordinate conversion of stored target position data may be performed each time. In other words, it may suffice that the target position data are stored in the same coordinate system.

The target position storage unit 33 stores a travel trajectory based on amounts of movements detected by the movement amount detection unit 32 and positions of targets detected by the target position detection unit 31 in association with each other in the odometry coordinate system.

Figure 6:
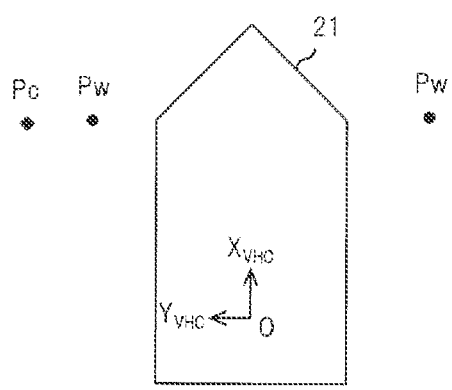
FIG. 6 is a diagram illustrative of target positions in the vehicle coordinate system.
Figure 6:
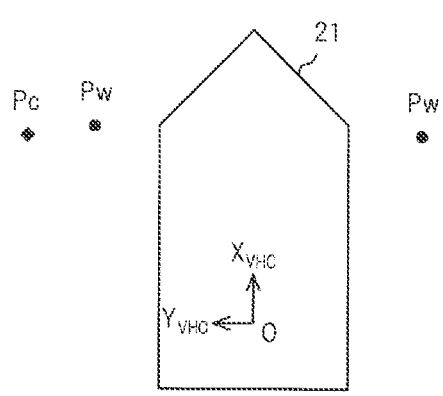
Figure 6:
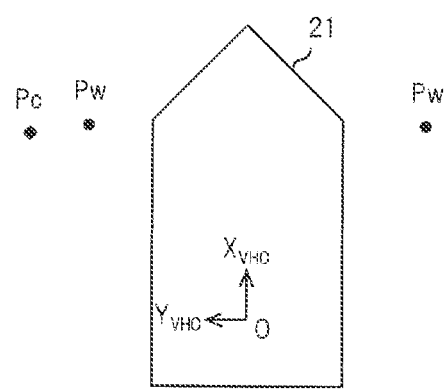
Figure 6:
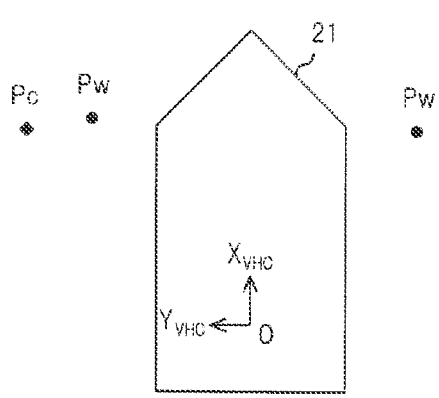

FIG. 6 is a diagram illustrative of target positions in the vehicle coordinate system.

In FIG. 6, positions in the vehicle coordinate system of targets detected by the target position detection unit 31 at the times t1 to t4 are illustrated. As to the targets, detection points Pc of the curb 23, present on the left side of the vehicle 21, detection points Pw of one of the lane markings 24 present on the left side of the vehicle 21, and detection points Pw of the other of the lane markings 24 present on the right side of the vehicle 21 are detected. The positions of the respective targets in the vehicle coordinate system change from moment to moment due to displacement and attitude change of the vehicle 21.

Figure 7:
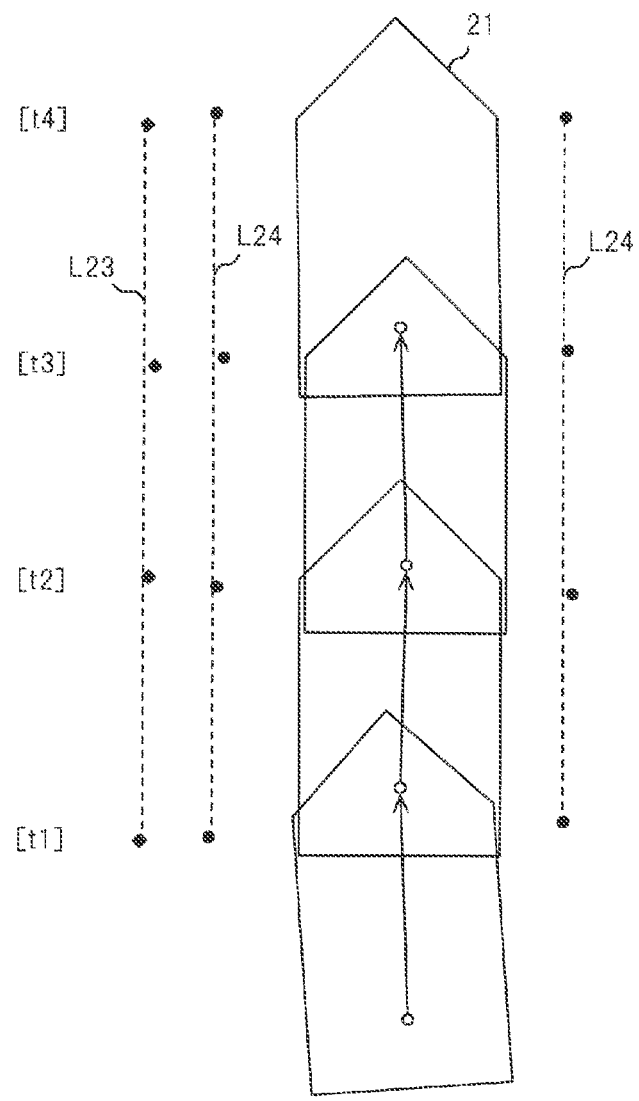
FIG. 7 is a diagram in which a travel trajectory is associated with target positions.

FIG. 7 is a diagram in which a travel trajectory based on amounts of movements of the vehicle is associated with target positions.

In other words, corresponding to the coordinate positions and the vehicle body attitudes of the vehicle at the times t1 to t4, the positions of the targets at the respective times are projected onto the odometry coordinate system. In still other words, at the respective times, the detection points Pc of the curb 23, present on the left side of the vehicle 21, the detection points Pw of one of the lane markings 24 present on the left side of the vehicle 21, and the detection points Pw of the other of the lane markings 24 present on the right side of the vehicle 21 are projected.

The target position storage unit 33 extracts straight lines directed along the driving lane from a point group acquired during a unit time Δt on the targets detected sequentially by the target position detection unit 31. Specifically, optimal parameters a, b, and c in an equation [$aX_{ODM}+bY_{ODM}+c=0$] representing a straight line are calculated in the odometry coordinate system.

When it is assumed that a unit time Δt is 0.2 seconds, the radar devices 12 operate at 25 Hz, and the cameras 13 operate at 30 Hz, data at five points and data at six points can be acquired with respect to the curb 23 and each lane marking 24, respectively, during the unit time Δt. It is assumed that whether each target is present on the left side or the right side of the vehicle 21 is determined depending on whether the $Y_{VHC}$ coordinate of the target in the vehicle coordinate system is positive or negative. The point group is divided depending on whether each point is positioned on the right side or the left side of the vehicle 21 in this way and subsequently the parameters a, b, and c are calculated.

When the sum of distances between a straight line and respective detection points becomes not less than a threshold value, it is not determined that the straight line is definable. On the other hand, when the sum of distances between a straight line and the respective detection points becomes less than the threshold value, it is determined that the straight line is definable. Two points that provide a maximum length therebetween are chosen out of the detection points that provide a minimum distance to the straight line, and information of the two points is, in conjunction with acquisition times thereof, stored in the target position storage unit 33.

In this case, a straight line L23 is extracted from the detection points Pc, detected at the times t1 to t4, of the curb 23, present on the left side of the vehicle 21. In addition, a straight line L24 is extracted from the detection points Pw, detected at the times t1 to t4, of one of the lane markings 24, present on the left side of the vehicle 21. Further, another straight line L24 is extracted from the detection points Pw, detected at the times t1 to t4, of the other of the lane markings 24, present on the right side of the vehicle 21.

The adjustment range setting unit 34 groups portions of target position data stored in the target position storage unit 33 into groups according to turning states of the vehicle and, based on amounts of movements of the vehicle when the target position data are detected, sets adjustment ranges for the groups.

First, a turning point Pt of the vehicle is detected from a travel trajectory based on amounts of movements. In the embodiment, a turning point Pt is detected by means of either of the following methods.

Figure 8A:
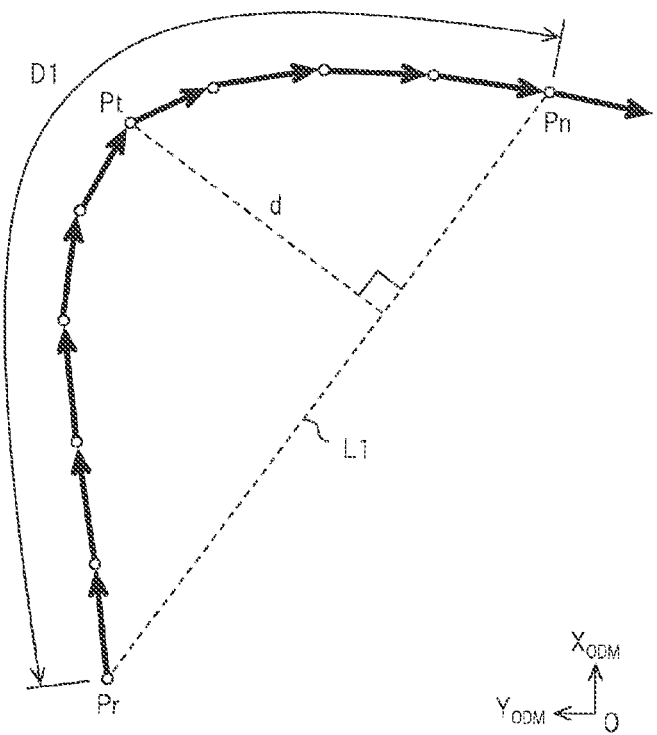
FIGS. 8A and 8B are diagrams illustrative of detection methods of a turning point Pt.
Figure 8B:
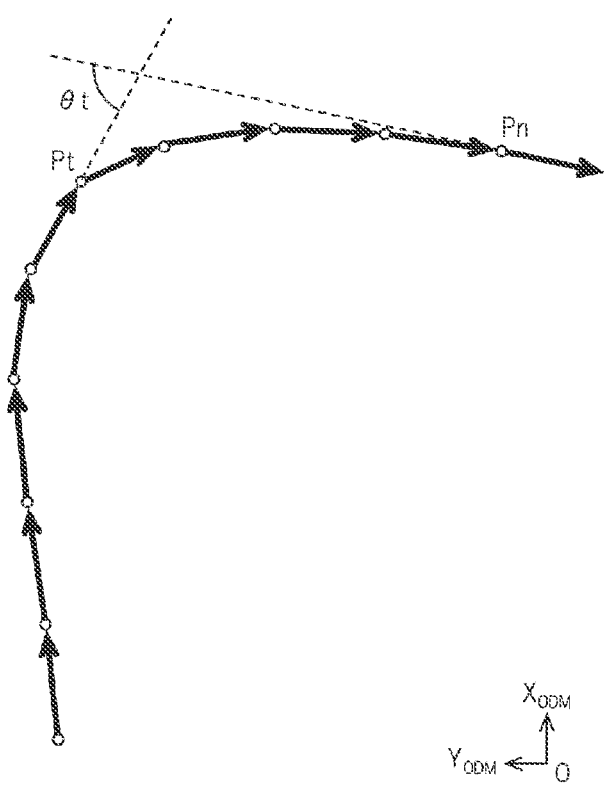

FIGS. 8A and 8B are diagram a illustrative of detection methods of a turning point Pt.

In FIG. 8A, a present location Pn and a point Pr reached by going back from the present location Pn by a predetermined set distance D1 are connected by a straight line L1. On this basis, in a range going back from the present location Pn by the set distance D1, a point the distance d of which from the straight line L1 in the direction orthogonal thereto is not less than a predetermined set value d1 that is the farthest from the straight line L1 is detected as a turning point Pt.

In FIG. 8B, a point at which, going back from a present location Pn, turning angle θt of the vehicle first becomes not smaller than a predetermined set angle θ1 is detected as a turning point Pt. The turning angle θt of the vehicle is, in the odometry coordinate system, an amount of attitude change until a present vehicle body attitude is reached and is therefore an angle difference of the vehicle body with a present direction of the vehicle body used as a reference angle. The set angle θ1 is, for example, 60 degrees.

Next, target position data at points at or following the turning point Pt are grouped into a group of data, referred to as a first group Gr1. In addition, target position data at points preceding the turning point Pt are grouped into another group of data, referred to as a second group Gr2.

Figure 9:
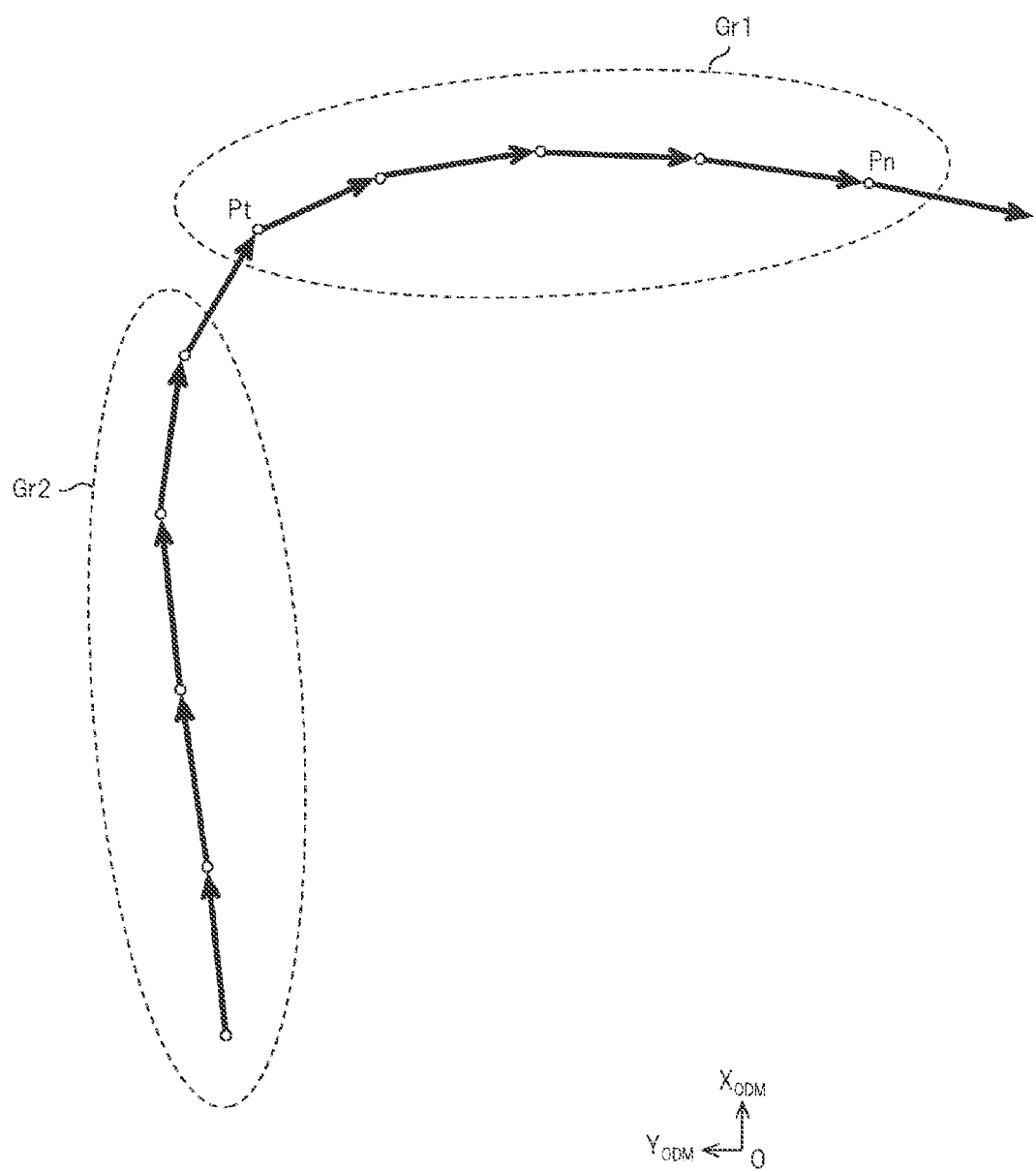
FIG. 9 is a diagram illustrative of grouping.

FIG. 9 is a diagram illustrative of grouping.

In FIG. 9, target position data from the turning point Pt to the present location Pn and target position data in a predetermined range preceding the turning point Pt are grouped into a first group Gr1 and a second group Gr2, respectively.

Next, an allowable range α and allowable ranges β1 and β2 in positionally adjusting (laterally moving) and angularly adjusting (rotating) the grouped target position data, respectively, to match the grouped target position data with map information are set. Positions [xg, yg] of the grouped target position data are allowed to be positionally adjusted within a range having a radius α with the center at the turning point Pt in the odometry coordinate system, and angles ϕg of the grouped target position data are allowed to be angularly adjusted within ranges β1 and β2 with the rotation center at the turning point Pt in the odometry coordinate system. Note that the allowable ranges β1 and β2 may be set at the same angular range. In addition, when the adjustment is performed with respect to only the first group Gr1, only the allowable range may be set with the allowable range β2 set at zero, and, when the adjustment is performed with respect to only the second group Gr2, only the allowable range β2 may be set with the allowable range β1 set at zero.

First, as travel distance in the amount of movement of the vehicle increases, error is more likely to occur in odometry information. Thus, as travel distance dm increases, the allowable range α is made larger.

Figure 10:
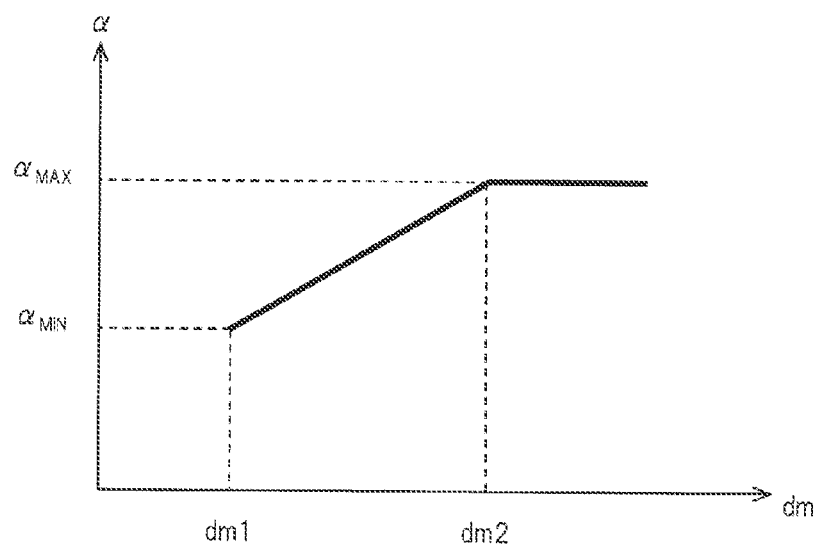
FIG. 10 is a map used for setting of an allowable range $\alpha$.

FIG. 10 is a map used for setting of the allowable range α.

The abscissa and the ordinate of the map represent the travel distance dm in the amount of movement of the vehicle in target position data and the allowable range α for position adjustment, respectively. As to the travel distance dm, a value dm1 that is greater than 0 and a value dm2 that is greater than dm1 are determined in advance. As to the allowable range α, a value $\alpha_{MIN}$ that is greater than 0 and a value $\alpha_{MAX}$ that is greater than $\alpha_{MIN}$ are determined in advance. When the travel distance dm is in a range from dm1 to dm2, the longer the travel distance dm is, the larger becomes the allowable range α within a range from $\alpha_{MIN}$ to $\alpha_{MAX}$. In addition, when the travel distance dm is not less than dm2, the allowable range α is kept at $\alpha_{MAX}$.

As amount of turn in the amount of movement of the vehicle increases, larger sideslip occurs, which causes error to be likely to occur in the odometry information due to characteristics of sensors. Note that a larger amount of turn in the amount of movement of the vehicle means a smaller turning radius R. Thus, as the turning radius R decreases, the allowable ranges β1 and β2 are made larger.

Figure 11:
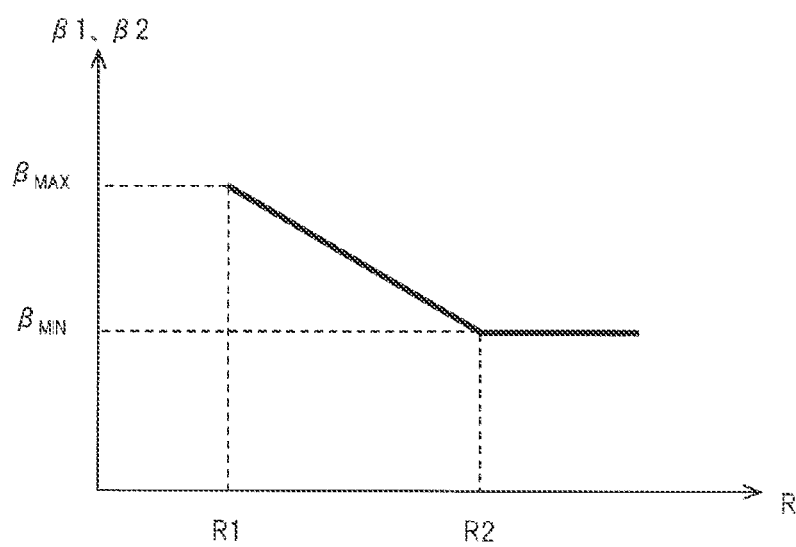
FIG. 11 is a map used for setting of allowable ranges and $\beta 2$ according to a turning radius R.

FIG. 11 is a map used for setting of the allowable ranges β1 and β2 according to the turning radius R.

The abscissa and the ordinate of the map represent the turning radius R of the vehicle in target position data and the allowable ranges β1 and β2 in angular correction. As to the turning radius R, a value R1 that is greater than 0 and a value R2 that is greater than R1 are determined in advance. As to the allowable ranges β1 and β2, a value $\beta_{MIN}$ that is greater than 0 and a value $\beta_{MAX}$ that is greater than $\beta_{MIN}$ are determined in advance. When the turning radius R is not less than R2, the allowable ranges β1 and β2 are kept at $\beta_{MIN}$. When the turning radius R is in a range from R2 to R1, the smaller the turning radius R is, the larger become the allowable ranges β1 and β2 within a range from $\beta_{MIN}$ to $\beta_{MAX}$.

The vehicle position estimation unit 35, by matching target position data stored in the target position storage unit 33 with map information stored in the map database 14 based on adjustment ranges set by the adjustment range setting unit 34, estimates a vehicle position of the vehicle 21 in a map coordinate system.

First, when the target position data are matched with the map information, an arrangement of the respective groups that minimizes matching error is calculated while the target position data are moved within the adjustment ranges with the turning point Pt as a fulcrum. In the adjustment, while relative positional relationships among target position data in the respective group are maintained, a relative relationship between the groups is adjusted with the turning point Pt as a fulcrum. In other words, while the pieces of data in the respective ones of the first group Gr1 and the second group Gr2 are not moved within the groups, each of the first group Gr1 and the second group Gr2 is moved and rotated as a whole. When the grouped target position data are fitted to the map information, straight lines L23 are extracted from detection points Pc of curbs 23 and straight lines L24 are extracted from detection points Pw of lane markings 24, as described afore, and subsequently, using these straight lines L23 and L24, the target position data are fitted to the map information.

Figure 12:
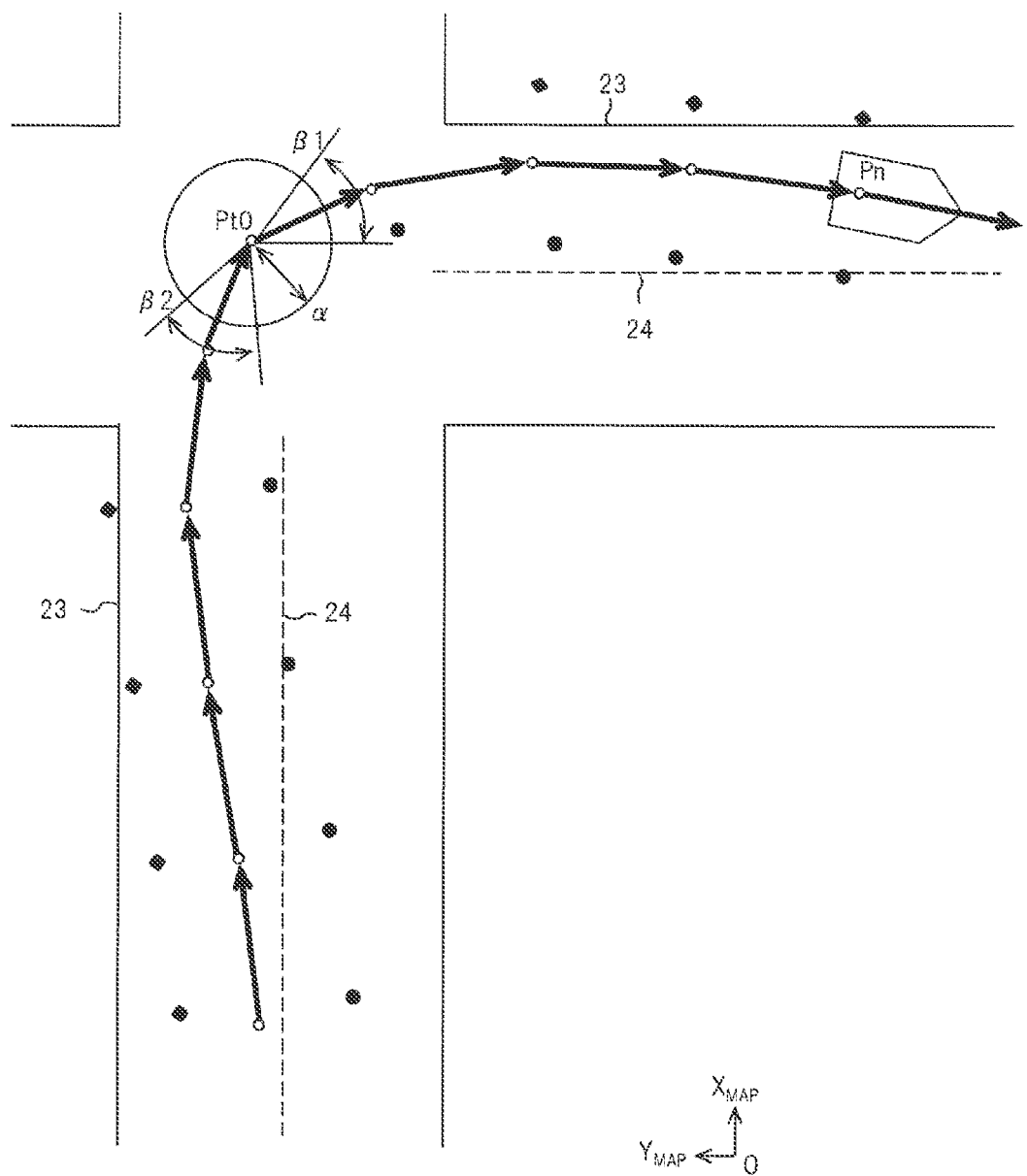
FIG. 12 is a diagram illustrative of target position data before adjustment.

FIG. 12 is a diagram illustrative of target position data before adjustment.

The map coordinate system is a two-dimensional coordinate system when viewed in plan, and it is assumed that the east-west direction and the north-south direction correspond to the $X_{MAP}$-axis and the $Y_{MAP}$-axis, respectively. The vehicle body attitude (azimuth) is represented by counterclockwise angle with 0 degrees being due east. In FIG. 12, a situation when the vehicle made a right turn at the intersection of a crossroads is illustrated. Both before and after the right turn, detection points of curbs indicated by filled rhombuses and detection points of lane markings indicated by filled circles are different from the corresponding positions of curbs 23 and lane markings 24 in the map coordinate system, respectively. In FIG. 12, allowable ranges within which target position data can be adjusted are also illustrated, and the target position data are, with respect to each group, allowed to be positionally adjusted and angularly adjusted within a range having a radius α and ranges β1 and β2, respectively, with the center at a turning point Pt0 before adjustment.

Figure 13:
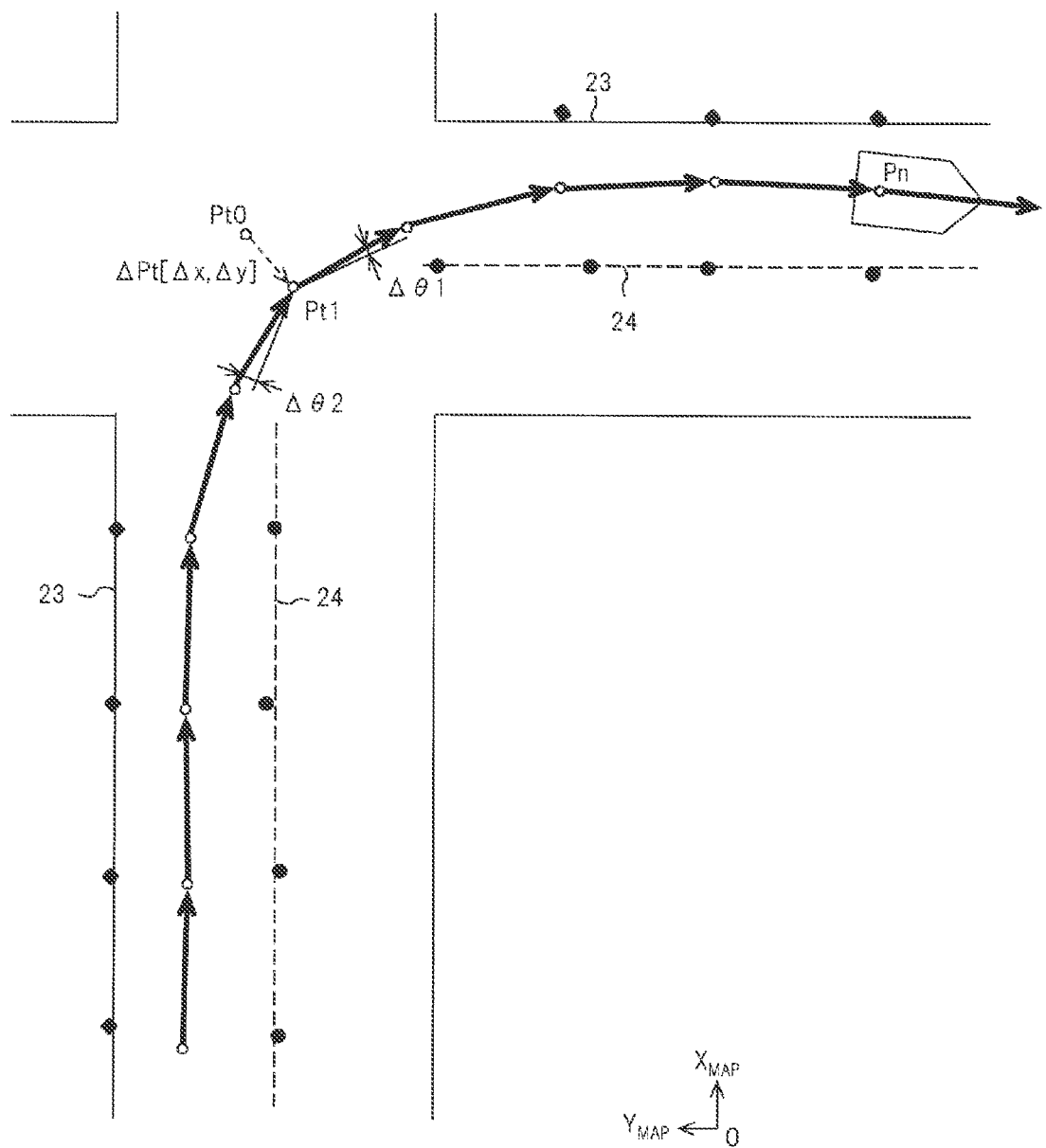
FIG. 13 is a diagram illustrative of target position data after adjustment.

FIG. 13 is a diagram illustrative of target position data after adjustment.

In this example, the grouped target position data are matched with the map information with the turning point Pt as a fulcrum. In other words, the arrangement of the respective groups is adjusted with the turning point Pt as a fulcrum in such a way that positional displacements of detection points of curbs and detection points of lane markings from the corresponding positions of the curbs 23 and the lane markings 24 in the map coordinate system are minimized. First, the turning point is positionally adjusted from Pt0 to Pt1, and an amount of adjustment in the adjustment is ΔPt[Δx, Δy], which comes within the allowable range α. In addition, the target position data group at and following the turning point Pt1 is angularly adjusted with the rotation center at the turning point Pt1, and an amount of adjustment in the adjustment is Δθ1, which comes within the allowable ranges β1 and β2. Similarly, the target position data group preceding the turning point Pt1 is also adjusted with the rotation center at the turning point Pt1, and an amount of adjustment in the adjustment is Δθ2, which comes within the allowable ranges β1 and β2. The above adjustment causes detection points of curbs and detection points of lane markings in both the target position data before the right turn and the target position data after the right turn to substantially coincide with the corresponding positions of the curbs 23 and the lane markings 24 in the map coordinate system.

The vehicle position estimation unit 35, after, as described above, matching target position data stored in the target position storage unit 33 with map information stored in the map database 14, estimates a vehicle position of the vehicle 21 in the map coordinate system.

The map coordinate system is a two-dimensional coordinate system when viewed in plan, and it is assumed that the east-west direction and the north-south direction correspond to the $X_{MAP}$-axis and the $Y_{MAP}$-axis, respectively. The vehicle body attitude (azimuth) is represented by a counterclockwise angle with 0 degrees being due east. In the map coordinate system, three parameters, namely a coordinate position [$X_{MAP}, Y_{MAP}$] and a vehicle body attitude [$\theta_{MAP}$] of the vehicle, are estimated. For the matching (map matching), for example, an iterative closest point (ICP) algorithm is used. When straight lines are matched with each other in the matching, the endpoints at both ends of the straight lines are matched with each other as evaluation points, and, when the space between the endpoints at both ends is wide, points in the space may be interpolated.

If the degree of matching in the matching is high when the vehicle position estimation unit 35 adjusts the target position data within the allowable ranges, the target position storage unit 33 corrects (updates) stored target position data into target position data after adjustment. On the other hand, if the degree of matching in the matching is low when the vehicle position estimation unit 35 adjusts the target position data within the allowable ranges, the target position storage unit 33 maintains stored target position data, that is, target position data before adjustment.

Next, vehicle position estimation processing that the controller 16 performs at each predetermined interval (for example, 10 msec) will be described.

Figure 14:
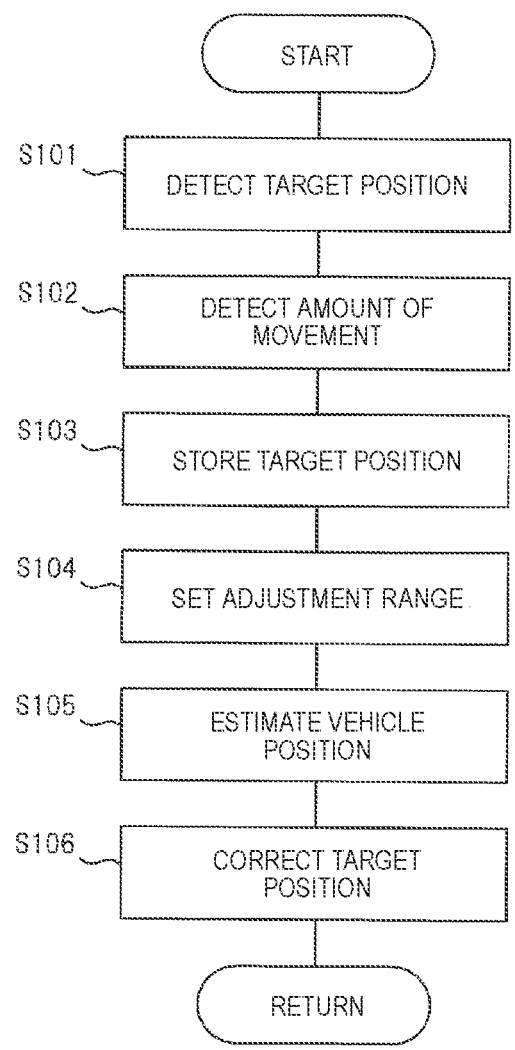
FIG. 14 is a flowchart illustrative of vehicle position estimation processing.

FIG. 14 is a flowchart illustrative of the vehicle position estimation processing.

First, step S101 corresponds to processing performed by the target position detection unit 31, in which positions of targets present in a periphery of the vehicle, such as a curb 23 and lane markings 24, are detected as relative positions with respect to the vehicle in the vehicle coordinate system fixed to the vehicle. In other words, detection points Pc of the curb 23 detected by the radar devices 12 and detection points Pw of the lane markings 24 detected by the cameras 13 are detected in the vehicle coordinate system.

The succeeding step S102 corresponds to processing performed by the movement amount detection unit 32, in which odometries each of which is an amount of movement per unit time of the vehicle 21 are detected from various types of information detected by the sensor group 15. Integration of the odometries enables a travel trajectory of the vehicle to be calculated in the odometry coordinate system. In other words, three parameters, namely a coordinate position $[X_{ODM}, Y_{ODM}]$ and a vehicle body attitude $[\theta_{ODM}]$, of the vehicle are stored in the odometry coordinate system at each operation cycle.

The succeeding step S103 corresponds to processing performed by the target position storage unit 33, in which the travel trajectory based on the amounts of movements detected by the movement amount detection unit 32 and the positions of the targets detected by the target position detection unit 31 are stored in association with each other in the odometry coordinate system. In other words, target position data detected at respective points of time are moved by amounts of movements of the vehicle during elapsed times from the respective points of time to the present point of time, and, corresponding to the coordinate positions and vehicle body attitudes of the vehicle at the respective points of time, the respective target position data of the curb 23, the lane markings 24, and the like are projected onto the odometry coordinate system and stored.

The succeeding step S104 corresponds to processing performed by the adjustment range setting unit 34, in which portions of the target position data stored in the target position storage unit 33 are grouped into groups according to turning states of the vehicle and, based on amounts of movements of the vehicle when the target position data are detected, adjustment ranges for the groups are set. First, a turning point Pt of the vehicle is detected from the travel trajectory, and target position data at points at or following the turning point Pt are grouped into a first group Gr1. In addition, target position data at points preceding the turning point Pt are grouped into a second group Gr2. Next, an allowable range α and allowable ranges β1 and β2 in positionally adjusting and angularly adjusting the grouped target position data, respectively, in accordance with the map information are set.

The succeeding step S105 corresponds to processing performed by the vehicle position estimation unit 35, in which, by matching the stored target position data with the corresponding target positions in the map information based on the adjustment ranges, a vehicle position of the vehicle 21 in the map coordinate system is estimated. First, when the target position data are matched with the corresponding target positions in the map information, an arrangement of the respective groups that minimizes matching error is calculated while the target position data are moved within the adjustment ranges with the turning point Pt as a fulcrum, and subsequently a vehicle position of the vehicle 21 in the map coordinate system is estimated. In other words, in the map coordinate system, three parameters, namely a coordinate position $[X_{MAP}, Y_{MAP}]$ and a vehicle body attitude $[\theta_{MAP}]$ of the vehicle, are estimated.

The succeeding step S106 corresponds to processing performed by the target position storage unit 33, in which the target position data are updated appropriately and subsequently the process returns to a predetermined main program. In other words, when the vehicle position estimation unit 35 adjusts the target position data within the allowable ranges, a degree of matching in the matching is judged. When the degree of matching is high, the stored target position data are corrected (updated) into target position data after adjustment. On the other hand, when the degree of matching is low, without correcting (updating) the target position data, the already-stored target position data, that is, target position data before adjustment, are maintained.

The above is a description of the vehicle position estimation processing.

<Operation>

By matching positions of targets, such as a curb 23 detected by the radar devices 12 and lane markings 24 detected by the cameras 13, with positions of the respective targets coded into data as map information in advance, a vehicle position of the vehicle 21 is estimated. The present embodiment exemplifies a method in which the map information is created using only targets, such as the curb 23 and the lane markings 24, the detection of which is comparatively easier than other targets and that can be described as two-dimensional data when viewed in plan and, using the map information, estimation of a vehicle position is performed. Note that, when a higher estimation accuracy of vehicle positions is to be attained, map information having three-dimensional (length, width, and height) data of structures may be used. The present embodiment may also be applied to this case.

Storing a certain amount of past travel trajectory in the odometry coordinate system by use of motion information of the vehicle 21 and matching the odometry coordinate system, onto which the target position data are projected, with the map coordinate system, in which target positions are stored in advance, enable a vehicle position to be estimated. However, there is a problem in that, in the odometry coordinate system, the longer travel distance is and the larger amount of turn is, the larger becomes cumulative error. FIG. 12 is a diagram illustrative of target position data before adjustment. In this scene, when the vehicle made a right turn, the amount of turn increased and odometry error occurred, which caused a travel trajectory to be calculated as if the vehicle had made a larger turn than the actual one, and a road shape that target position data stored in accordance with the calculated travel trajectory constitute has become a shape displaced from the actual road shape.

For this reason, when a road shape that target position data kept unchanged constitute is matched with a road shape in the map information, the degree of matching decreases and the minimum error increases, which makes it impossible to estimate a vehicle position with high accuracy. Thus, in the odometry coordinate system, by matching groups of at least portions of target position data, in which a travel trajectory and target positions are stored in association with each other, with target positions in the map information while adjusting the position and angle between the groups, a vehicle position of the vehicle is estimated.

Next, a specific procedure will be described.

First, positions of targets, such as curbs 23 and lane markings 24, present along driving lanes are detected in the vehicle coordinate system (step S101), and, by integrating various types of information detected by the sensor group 15, a travel trajectory of the vehicle is detected in the odometry coordinate system (step S102). The detected travel trajectory and the detected positions of targets are stored in association with each other in the odometry coordinate system (step S103).

Portions of the stored target position data are grouped according to turning states of the vehicle, and, based on amounts of movements of the vehicle when the target position data are detected, adjustment ranges for the groups are set (step S104). In this step, first, a turning point Pt of the vehicle is detected from the travel trajectory. For example, a present location Pn and a point Pr reached by going back from the present location Pn by a set distance D1 are connected by a straight line L1, and, in a range going back from the present location Pn by the set distance D1, a point the distance d of which from the straight line L1 in the direction orthogonal thereto is not less than a predetermined set value d1 that is the farthest from the straight line L1 is detected as a turning point Pt. Alternatively, a point at which, going back from a present location Pn, turning angle σt of the vehicle first becomes not smaller than a set angle θ1 is detected as a turning point Pt. As described above, use of the distance d from the straight line L1 and the turning angle σt enables a turning point Pt of the vehicle to be detected easily.

By grouping target position data at points at or following the turning point Pt, a first group Gr1 is set, and, in conjunction therewith, by grouping target position data at points preceding the turning point Pt, a second group Gr2 is set. In addition, an allowable range α and allowable ranges β1 and β2 in positionally adjusting and angularly adjusting the grouped target position data, respectively, to match the target position data with the map information are set. In the setting, as the travel distance dm in the amount of movement of the vehicle in the stored target position data increases, the allowable range α is made larger, and, as the amount of turn in the amount of movement of the vehicle increases (as the turning radius decreases), the allowable ranges β1 and β2 are made larger.

By matching the stored target position data with the map information based on the adjustment ranges α and β1 and β2 with the turning point Pt as a fulcrum, a vehicle position of the vehicle 21 in the map coordinate system is estimated (step S105). In other words, since, while the target position data are moved within the adjustment ranges with the turning point Pt as a fulcrum with respect to the map information, an arrangement of the respective groups that minimizes matching error is calculated and subsequently a vehicle position of the vehicle 21 is estimated, influence from cumulative error in odometry information may be suppressed and estimation accuracy of vehicle positions may be improved. In still other words, since the above processing is equivalent to, with three degrees of freedom, namely a position [xg, yg] and an angle ϕg of grouped target position data, being provided, matching the target position data with the map information with the turning point Pt as a fulcrum, estimation accuracy of coordinate positions [$X_{MAP}$, $Y_{MAP}$] and vehicle body attitudes [$θ_{MAP}$] of the vehicle may be improved.

Since, in particular during turning travel, sideslip occurs to a vehicle, error is likely to occur in odometry information. Therefore, detection of a turning point Pt, grouping of target position data into groups at points at and following the turning point Pt and preceding the turning point Pt, and position adjustment and angle adjustment of each group with the turning point Pt as a fulcrum, as described above, enables error in odometry information to be eliminated effectively. On the other hand, since adjustment of target position data is performed within the allowable ranges α and β1 and β2 with the turning point Pt as a fulcrum, excessive movement may be suppressed and correction may be made within a proper range. Since, as the travel distance dm increases, error in odometry information is likely to be larger, setting an allowable range α according to the travel distance dm and setting allowable ranges β1 and β2 according to the amount of turn in the amount of movement of the vehicle enable proper allowable ranges α and β1 and β2 to be set and effective position adjustment and angle adjustment to be performed.

When groups of grouped target position data are matched with the map information while adjusting the position and angle between the groups, straight lines L23 and straight lines L24 are extracted from detection points Pc of the curbs 23 and detection points Pw of the lane markings 24 in the groups, respectively, and subsequently, using these straight lines L23 and L24, the target position data are matched with the map information.

Figure 15A:
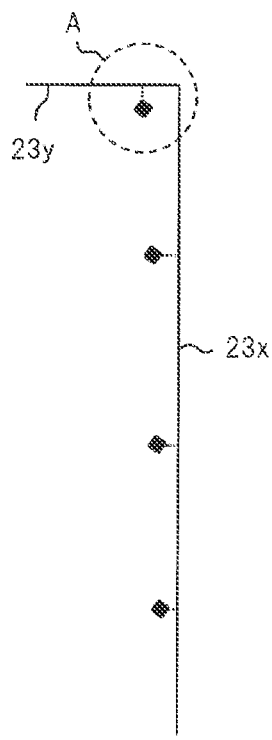
FIGS. 15A and 15B are diagrams illustrative of an effect of extracting a straight line.
Figure 15B:
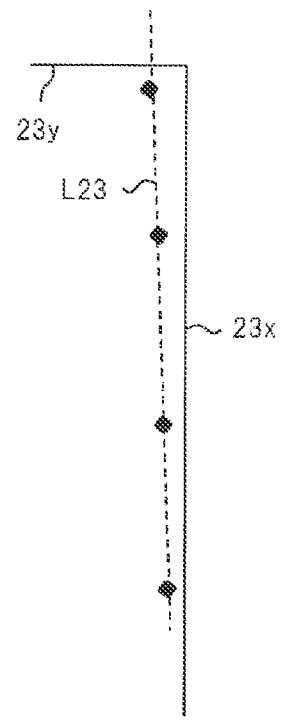

FIGS. 15A and 15B are diagrams illustrative of an effect of extracting a straight line.

FIG. 15A illustrates a case where, without extracting a straight line, the detection points Pc of curbs 23 indicated by filled rhombuses are matched with map information as it is. A detection point Pc present in a region A, while being required to be matched with a line representing a curb 23x, is matched with a line representing a curb 23y, which is the closest to the detection point Pc. FIG. 15B illustrates a case where extraction of a straight line L23 enables the detection point Pc to be matched with the line representing the curb 23x. As described above, extraction of straight lines and matching of the target position data with the map information by use of the straight lines enable estimation accuracy of vehicle positions to be improved.

If the degree of matching in the matching is high when the target position data are adjusted within the allowable ranges, the stored target position data are corrected (updated) into target position data after adjustment (step S106). The correction enables target position data with high accuracy to be stored. Conversely, when the degree of matching is low, the stored target position data, that is, target position data before adjustment, are maintained. This operation enables a situation in which target position data with low accuracy are stored to be prevented from occurring.

<Variation>

Although, in the first embodiment, target position data at points at or following the turning point Pt are grouped into a group of data and, in conjunction therewith, target position data at points preceding the turning point Pt are grouped into another group of data and the respective group of target position data are adjusted, the present invention is not limited to the configuration. In other words, if, at a point of time prior to the turning point Pt being passed, target position data at points preceding the turning point Pt have already been adjusted through matching with the map information, it is unnecessary to further perform adjustment through matching with the map information after the turning point Pt being passed. Therefore, at least target position data at points at or following the turning point Pt may be grouped into a group, and, while adjusting the position and angle of the group with the turning point Pt as a fulcrum, the group may be matched with the map information. In other words, the second group Gr2, which is a group of target position data at points preceding the turning point Pt, is fixed, and only the first group Gr1, which is a group of target position data at points at or following the turning point Pt, may be adjusted. This configuration enables an operation load to be suppressed and matching to be performed more efficiently.

Application Example

Although, in the first embodiment, the allowable ranges $\beta 1$ and $\beta 2$ in the angular correction are set according to the amount of turn in the amount of movement of the vehicle, the present invention is not limited to the configuration. Since, when a change in the speed of the vehicle occurs, error is likely to occur in the odometry information due to characteristics of sensors and, as travel distance increases, the error is further accumulated, the allowable ranges $\beta 1$ and $\beta 2$ in the angular correction may be set according to the travel distance dm of the vehicle.

Figure 16:
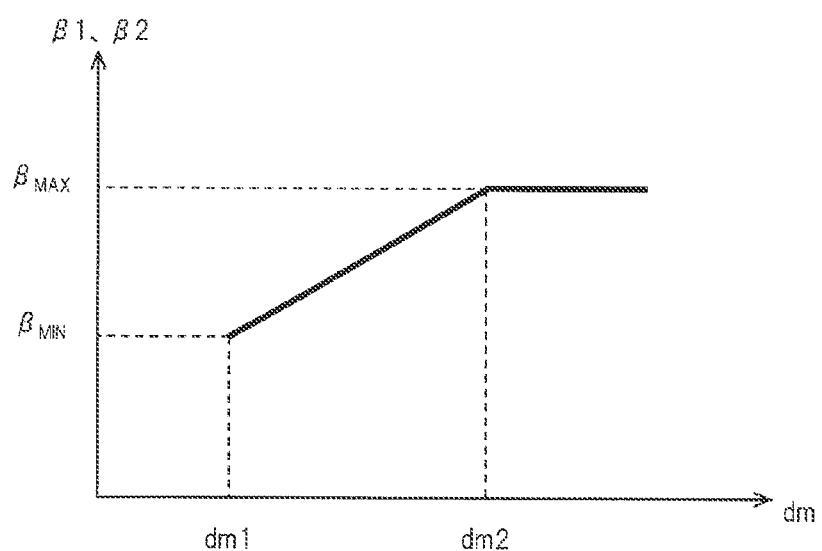
FIG. 16 is a map used for setting of the allowable ranges and $\beta 2$ according to travel distance dm.

FIG. 16 is a map used for setting of the allowable ranges $\beta 1$ and $\beta 2$ according to the travel distance dm.

The abscissa and the ordinate of the map represent a movement distance dm in the amount of movement of the vehicle in target position data and the allowable ranges $\beta 1$ and $\beta 2$ in the angle adjustment, respectively. As to the movement distance dm, a value dm1 that is greater than 0 and a value dm2 that is greater than dm1 are determined in advance. As to the allowable ranges $\beta 1$ and $\beta 2$, a value $\beta_{MIN}$ that is greater than 0 and a value $\beta_{MAX}$ that is greater than $\beta_{MIN}$ are determined in advance. When the movement distance dm is in a range from dm1 to dm2, the longer the movement distance dm is, the larger becomes the allowable range $\beta$ within a range from $\beta_{MIN}$ to $\beta_{MAX}$. In addition, when the movement distance dm is not less than dm2, the allowable ranges $\beta 1$ and $\beta 2$ are kept at $\beta_{MAX}$.

Setting the allowable ranges $\beta 1$ and $\beta 2$ in the angular correction according to the movement distance dm, as described above, enables proper allowable ranges $\beta 1$ and $\beta 2$ to be set and effective angle adjustment to be performed.

Note that the allowable ranges $\beta 1$ and $\beta 2$ may be configured to be set in consideration of both the amount of turn and the movement distance dm in the amount of movement of the vehicle in the target position data. In addition, acceleration/deceleration may also be configured to be taken into consideration as the amount of movement of the vehicle.

<Correspondence Relationships>

In the first embodiment, the target position detection unit 31 and the processing in step S101 correspond to a "target position detection unit". The movement amount detection unit 32 and the processing in step S102 correspond to a "travel trajectory detection unit". The target position storage unit 33 and the processing in steps S103 and S106 correspond to a "target position data storage unit". The map database 14 corresponds to a "map information storage unit". The adjustment range setting unit 34 and the processing in step S104 correspond to a "target position data correction unit". The vehicle position estimation unit 35 and the processing in step S105 correspond to a "vehicle position estimation unit".

<Advantageous Effects>

Next, advantageous effects attained by a main portion in the first embodiment will be described.

(1) A vehicle position estimation device according to the first embodiment detects positions of a target present in a periphery of a vehicle and, in conjunction therewith, detects amounts of movements of the vehicle, and stores the positions of the target as target position data, based on the amounts of movements. In addition, the vehicle position estimation device groups a portion of the target position data into a group according to turning states of the vehicle, and, based on amounts of movements of the vehicle when the target position data are detected, sets an adjustment range for the group. Further, the vehicle position estimation device acquires map information including positions of the target and, by matching the target position data with the positions of the target in the map information based on the set adjustment range, estimates a vehicle position of the vehicle.

Since, as described above, by matching the target position data with the map information while adjusting the target position data within the adjustment range, a vehicle position of the vehicle is estimated, estimation accuracy of vehicle positions may be improved.

(2) The vehicle position estimation device according to the first embodiment sets the adjustment range as a positional range and angular range between groups.

Adjustment of the position and angle between groups as described above enables influence from error in odometry information to be suppressed.

(3) The vehicle position estimation device according to the first embodiment, as the amount of movement of the vehicle in the stored target position data increases, makes allowable ranges $\alpha$ and $\beta 1$ and $\beta 2$ larger.

Adjustment of the allowable ranges $\alpha$ and $\beta 1$ and $\beta 2$ according to the amount of movement (turning radius R and travel distance dm) of the vehicle as described above enables proper allowable ranges to be set and effective position adjustment and angle adjustment to be performed.

(4) The vehicle position estimation device according to the first embodiment detects a turning point Pt of the vehicle from a travel trajectory based on amounts of movements of the vehicle and, based on the turning point Pt, groups target position data.

Detection of the turning point Pt and grouping of target position data based on the turning point Pt, as described above, enable error in odometry information to be eliminated efficiently with the turning point Pt as a fulcrum.

(5) The vehicle position estimation device according to the first embodiment, when target position data are matched with positions of a target in the map information, corrects (updates) the target position data based on a matching result.

Since, as described above, whether or not target position data is corrected is determined based on a matching result, target position data with high accuracy may be stored.

(6) The vehicle position estimation device according to the first embodiment extracts straight lines from target position data and matches the extracted straight lines with positions of a target in the map information.

Detection of straight lines and fitting of the extracted straight lines to the map information, as described above, enable matching accuracy to be improved.

(7) A vehicle position estimation method according to the first embodiment detects positions of targets present in a periphery of a vehicle and, in conjunction therewith, detects amounts of movements of the vehicle, and stores the positions of the targets as target position data, based on the amounts of movements. In addition, the vehicle position estimation method groups a portion of the target position data into a group according to turning states of the vehicle, and, based on amounts of movements of the vehicle when the target position data are detected, sets an adjustment range for the group. Further, the vehicle position estimation device acquires map information including positions of the target and, by matching the target position data with the positions of the target in the map information based on the set adjustment range, estimates a vehicle position of the vehicle.

Since, as described above, by matching the target position data with the map information while adjusting the target position data within the adjustment range, a vehicle position of the vehicle is estimated, estimation accuracy of vehicle positions may be improved.

Although the present invention has been described with reference to a limited number of embodiments, the scope of the present invention is not limited thereto, and modifications of the respective embodiments based on the above disclosure are obvious to those skilled in the art.

REFERENCE SIGNS LIST

11 Vehicle position estimation device
12 Radar device
13 Camera
14 Map database
15 Sensor group
16 Controller
21 Vehicle
22 Road surface
23 Curb
24 Lane marking
31 Target position detection unit
32 Movement amount detection unit
33 Target position storage unit
34 Adjustment range setting unit
35 Vehicle position estimation unit

The invention claimed is:

1. A vehicle position estimation device comprising:
a controller programmed to:
   detect a position of a target present in a periphery of a vehicle;
   detect an amount of movement of the vehicle;
   store positions of the target as target position data, based on detected amounts of movements of the vehicle;
   acquire map information including the positions of the target from a map database;
   group a portion of the stored target position data into a group according to turning states of the vehicle and, based on amounts of movements of the vehicle when the target position data are detected, set an adjustment range for the group; and
   by matching the stored target position data with the positions of the target in the map information based on the adjustment range, estimate a vehicle position of the vehicle.

2. The vehicle position estimation device according to claim 1, wherein the controller is further programmed to set the adjustment range as a positional range and an angular range.

3. The vehicle position estimation device according to claim 2, wherein the controller is further programmed to, as the amount of movement of the vehicle in the target position data increases, make the adjustment range larger.

4. The vehicle position estimation device according to claim 2, wherein the controller is further programmed to detect a turning point of the vehicle from a travel trajectory based on the amounts of movement of the vehicle and, based on the turning point, groups the target position data.

5. The vehicle position estimation device according to claim 2, wherein the controller is further programmed to, when the stored target position data are matched with the positions of the target in the map information, correct the target position data based on a matching result.

6. The vehicle position estimation device according to claim 2, wherein the controller is further programmed to extract a straight line from the target position data and matches the extracted straight line with the positions of the target in the map information.

7. The vehicle position estimation device according to claim 1, wherein the controller is further programmed to make the adjustment range larger as the amount of movement of the vehicle in the target position data increases.

8. The vehicle position estimation device according to claim 7, wherein the controller is further programmed to detect a turning point of the vehicle from a travel trajectory based on the amounts of movement of the vehicle and, based on the turning point, groups the target position data.

9. The vehicle position estimation device according to claim 7, wherein the controller is further programmed to, when the stored target position data are matched with the positions of the target in the map information, correct the target position data based on a matching result.

10. The vehicle position estimation device according to claim 7, wherein the controller is further programmed to extract a straight line from the target position data and matches the extracted straight line with the positions of the target in the map information.

11. The vehicle position estimation device according to claim 1, wherein the controller is further programmed to detect a turning point of the vehicle from a travel trajectory based on the amounts of movement of the vehicle and, based on the turning point, groups the target position data.

12. The vehicle position estimation device according to claim 11, wherein the controller is further programmed to, when the stored target position data are matched with the positions of the target in the map information, correct the target position data based on a matching result.

13. The vehicle position estimation device according to claim 11, wherein the controller is further programmed to extract a straight line from the target position data and matches the extracted straight line with the positions of the target in the map information.

14. The vehicle position estimation device according to claim 1, wherein the controller is further programmed to, when the stored target position data are matched with the positions of the target in the map information, correct the target position data based on a matching result.

15. The vehicle position estimation device according to claim 14, wherein the controller is further programmed to extract a straight line from the target position data and matches the extracted straight line with the positions of the target in the map information.

16. The vehicle position estimation device according to claim 1, wherein the controller is further programmed to extract a straight line from the target position data and matches the extracted straight line with the positions of the target in the map information.

17. A vehicle position estimation method comprising:
 detecting a position of a target present in a periphery of a vehicle;
 detecting an amount of movement of the vehicle;
 storing positions of the target as target position data, based on amounts of movements detected;
 acquiring map information including the positions of the target from a map database
 grouping a portion of the stored target position data into a group according to turning states of the vehicle and, based on amounts of movements of the vehicle when the target position data are detected, setting an adjustment range for the group; and
 estimating a vehicle position of the vehicle by matching the stored target position data with the positions of the target in the map information acquired from the map database based on the adjustment range.

* * * * *